US008255682B2

(12) United States Patent
Zeng (10) Patent No.: US 8,255,682 B2
(45) Date of Patent: Aug. 28, 2012

(54) EARLY AUTHENTICATION IN CABLE MODEM INITIALIZATION (75) Inventor: Shengyou Zeng, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 1301 days.

(21) Appl. No.: 11/460,570

(22) Filed: Jul. 27, 2006

(65) Prior Publication Data
US 2008/0028437 A1 Jan. 31, 2008

(51) Int. Cl.
H04L 29/06 (2006.01)
(52) U.S. Cl. ............ 713/153; 713/156; 713/168; 726/2; 726/4; 726/14
(58) Field of Classification Search .................. 726/2, 4, 726/14; 713/153, 156, 168; 380/232; 709/223; 717/178
See application file for complete search history.

(56) References Cited

U.S. PATENT DOCUMENTS

| 5,918,019 | A | 6/1999 | Valencia |
| 6,028,933 | A | 2/2000 | Heer et al. |
| 6,049,826 | A * | 4/2000 | Beser ............................ 709/222 |
| 6,058,421 | A * | 5/2000 | Fijolek et al. .................. 709/225 |
| 6,070,246 | A * | 5/2000 | Beser .............................. 726/2 |
| 6,137,793 | A | 10/2000 | Gorman et al. |
| 6,170,061 | B1 | 1/2001 | Beser |
| 6,189,102 | B1 | 2/2001 | Beser |
| 6,819,682 | B1 | 11/2004 | Rabenko et al. |
| 6,986,157 | B1 * | 1/2006 | Fijolek et al. .................. 725/111 |
| 7,065,779 | B1 | 6/2006 | Crocker et al. |
| 7,099,338 | B1 * | 8/2006 | Lee ............................... 370/401 |
| 7,113,484 | B1 | 9/2006 | Chapman et al. |
| 7,114,070 | B1 * | 9/2006 | Willming et al. ............. 713/156 |
| 7,139,923 | B1 | 11/2006 | Chapman et al. |
| 7,293,282 | B2 * | 11/2007 | Danforth et al. .................. 726/4 |
| 2002/0052927 | A1 | 5/2002 | Park |
| 2002/0093955 | A1 | 7/2002 | Grand et al. |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |

(Continued)

FOREIGN PATENT DOCUMENTS
WO 00/72509 11/2000

OTHER PUBLICATIONS

Postel, J., "User Datagram Protocol", RFC 768, Aug. 28, 1980, 3 pgs.

(Continued)

Primary Examiner — Thanhnga B Truong
(74) Attorney, Agent, or Firm — Baker Botts L.L.P.

(57) ABSTRACT

A system that eliminates some of the security vulnerabilities in the prior art systems by using a new sequence of steps to perform initialization of the cable modem: Instead of performing authentication after the cable modem has been registered, the cable modem authentication step is performed immediately after the cable modem completes ranging. Thus an early authentication method and system are provided. The control of authentication is shifted from the cable modem to the CMTS. Instead of the CMTS relying on a Registration Request message (REG-REQ) to determine whether a cable modem must perform authentication (that is to determine if BPI+ is enabled) the CMTS configuration is what determines whether a cable modem must perform authentication.

21 Claims, 5 Drawing Sheets

U.S. PATENT DOCUMENTS

| | | | |
|---|---|---|---|
| 2004/0163129 A1 | 8/2004 | Chapman et al. | |
| 2004/0244043 A1 | 12/2004 | Lind et al. | |
| 2005/0265309 A1* | 12/2005 | Parandekar | 370/351 |
| 2005/0265376 A1 | 12/2005 | Chapman et al. | |
| 2005/0265392 A1 | 12/2005 | Chapman et al. | |
| 2005/0265397 A1 | 12/2005 | Chapman et al. | |
| 2006/0168612 A1 | 7/2006 | Chapman et al. | |
| 2007/0011735 A1* | 1/2007 | Weber et al. | 726/14 |

OTHER PUBLICATIONS

Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.
The Patent Office of the People's Republic of China, The Second Office Action, (English Translation), Chinese Patent Application No. 200680055492.8, 7 pages, Feb. 3, 2012.
The Patent Office of the People's Republic of China, The Third Office Action, (English Translation), Chinese Patent Application No. 200680055492.8, 7 pages, May 14, 2012.

* cited by examiner

EARLY AUTHENTICATION IN CABLE MODEM INITIALIZATION

FIELD OF THE INVENTION

The present invention relates to broadband communication systems and more particularly to broadband communication systems that utilize cable modems.

BACKGROUND

DOCSIS (Data Over Cable Service Interface Specification) is an international standard that defines an interface for high-speed data transmission over cable networks. Among other things, DOCSIS specifies how cable modems are initialized and authenticated.

The initialization and authentication process according to DOCISv2 involves several steps including:
a) Downstream search during which a signal is found and an upstream channel descriptor (UCD) is obtained. The UCD contains information that the cable modem will need, such as the upstream frequency, modulation type and channel bandwidth to use in order to communicate with a cable modem termination system (CMTS).
b) Ranging during which the modem adjusts its transmit power, frequency and timing as necessary to compensate for the distance between the modem and the CMTS.
c) DHCP (Dynamic Host Configuration Protocol) during which the modem obtains additional information about the network, gets an IP address and gets the name of a configuration file.
d) ToD (Time of Day) provides a timestamp to cable modem (this step may be optional).
e) TFTP (Trivial File Transfer Protocol) during which the cable modem downloads the configuration file whose name it was given during the DHCP process.
f) Registration during which the cable modem sends a registration request to the CMTS along with a list of the modem's configuration settings. If the CMTS approves of the modem's settings, the cable modem will respond with a registration response indicating a successful registration.
g) BPI+ (Baseline Privacy Infrastructure) process during which the cable modem is authenticated. Upon successful authentication, keys for authentication and encryption of subsequent data frames are distributed to the cable modem. The expiration times of the keys are also set. The BPI+ process is used to perform cable modem authentication after registration. The BPI+ process requires a cable modem to present an X.509 certificate to authenticate itself during initialization. If a cable modem fails authentication, then the CMTS will reject service to the cable modem and prevent the cable modem from coming online.

It is specifically noted that the BPI+ process is the last step in the cable modem initialization process.

Settings in a cable modem configuration file establish whether a particular cable modem is configured to perform BPI+ and authentication. The CMTS will only enforce authentication if the cable modem notifies the CMTS in a registration request message (REG-REQ) that BPI+ is enabled for that cable modem.

A REG-REQ message is a DOCSIS MAC-layer packet that is sent to the CMTS by a cable modem after the cable modem undergoes address assignment using the dynamic host configuration protocol (DHCP) and after the modem downloads a configuration file using trivial file transfer protocol (TFTP).

The contents of a REG-REQ message includes data from the configuration file stored in the modem and the data from the configuration file specifies the particular services the cable modem is entitled to perform. This data is signed by a secret code, known only to a TFTP server and the CMTS. This data includes an indication of whether or not the cable modem must authenticate using BPI+. It is noted that the indication that a modem must use BPI+ is sent via the configuration file and it can be compromised.

The information that the CMTS uses to determine whether BPI+ authentication should happen for a particular cable modem is stored in the particular modem's configuration file. However, a thief can manipulate the cable modem configuration files and remove BPI+ requirements. If such a change is made, cable modem authentication can be bypassed even if a cable service operator has provided a configuration file to a cable modem that requires the cable modem to perform BPI+ authentication. Additionally, before BPI+ authentication, all messages between cable modem and CMTS are unprotected.

DETAILED DESCRIPTION OF EMBODIMENTS

Several preferred embodiments of the present invention will be described with reference to the accompanying drawings. Various other embodiments of the invention are also possible and practical. This invention may be embodied in many different forms and the invention should not be construed as being limited to the embodiments set forth herein.

The figures listed above illustrate a preferred embodiment of the invention and the operation of such an embodiment. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiments to those skilled in the art. Those parts and elements not shown are conventional and known in the art.

In the following description, various specific details concerning the embodiments are set forth. However, it is understood that the invention may be practiced in ways other than the ways that utilize the specific details shown herein. Furthermore, various known circuits, structures, and techniques have not been shown or described herein in order to not unduly lengthen the disclosure.

Figure 1:
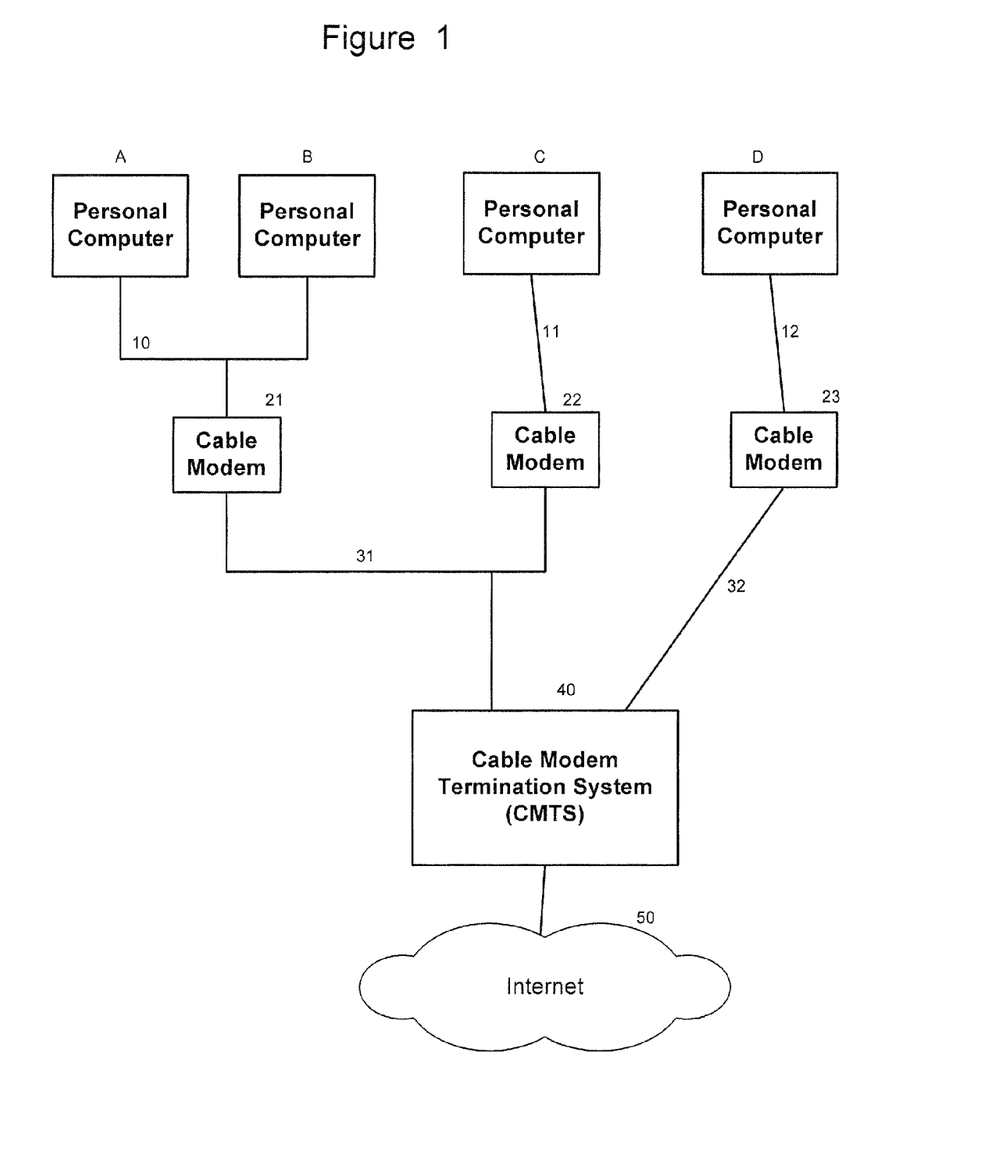
FIG. 1 is an overall system diagram of an embodiment described herein.

FIG. 1 is an overall block diagram of a first preferred embodiment of the present invention. As illustrated in FIG. 1, a number of computers designated A, B, C and D are connected to cable modems 21, 22 and 23 by local area networks (LANs) 10, 11 and 12. The cable modems 21, 22 and 23, are in turn connected to cable modem termination system (CMTS) 40 via coaxial cables 31 and 32. The CMTS 40 is in turn connected to the Internet 50.

It is noted that the four computers and three cable modems illustrated in FIG. 1 are representative and that the system can include any number of computers and cable modems up to the conventional type of system capacity constraints. It is also noted that multiple computers can be connected to a single cable modem, as is the case with modem 21. Likewise multiple modems can share a single coaxial connection to the CMTS as is the case with cable 31. Thus, the configuration on FIG. 1 is merely meant to be representative of a system with multiple end units and multiple cable modems connected to a CMTS.

The prior art initialization sequence of cable modems involves seven steps. Namely, the prior art initialization process involves (1) Downstream search, (2) Ranging, (3) DHCP—Dynamic host configuration protocol—, (4) ToD—Time of day—, (5) TFTP—Trivial file transfer protocol—, (6) Registration, and (7) BPI+ (Baseline Privacy Infrastructure). It is noted that the BPI+ process which provides security is the last step in the prior process. Furthermore in the prior art process, it is a configuration file in the cable modem that controls the BPI+ process.

In the exemplary embodiments described here, the CMTS unit 40 is in control of the cable modem authentication enforcement as described below. This effectively eliminates the possibility that someone can manipulate the cable modem configuration file and thereby cause the modem to bypass authentication.

Furthermore, in the exemplary embodiments described herein authentication is performed before a cable modem has established a Layer 3 connection via DHCP and immediately after the cable modem completes ranging. Furthermore, instead of the CMTS relying on the cable modem's REG-REQ to determine whether a cable modem must perform authentication (i.e. to determine whether BPI+ is enabled) the CMTS by itself determines whether a cable modem must perform authentication. That is, it is the CMTS configuration that determines whether a modem must perform authentication.

It is noted that in the exemplary embodiments described herein, a masquerading or unauthorized cable modem can be stopped from gaining access to the network and cable modem configuration files cannot be manipulated to bypass authentication.

Figure 2:
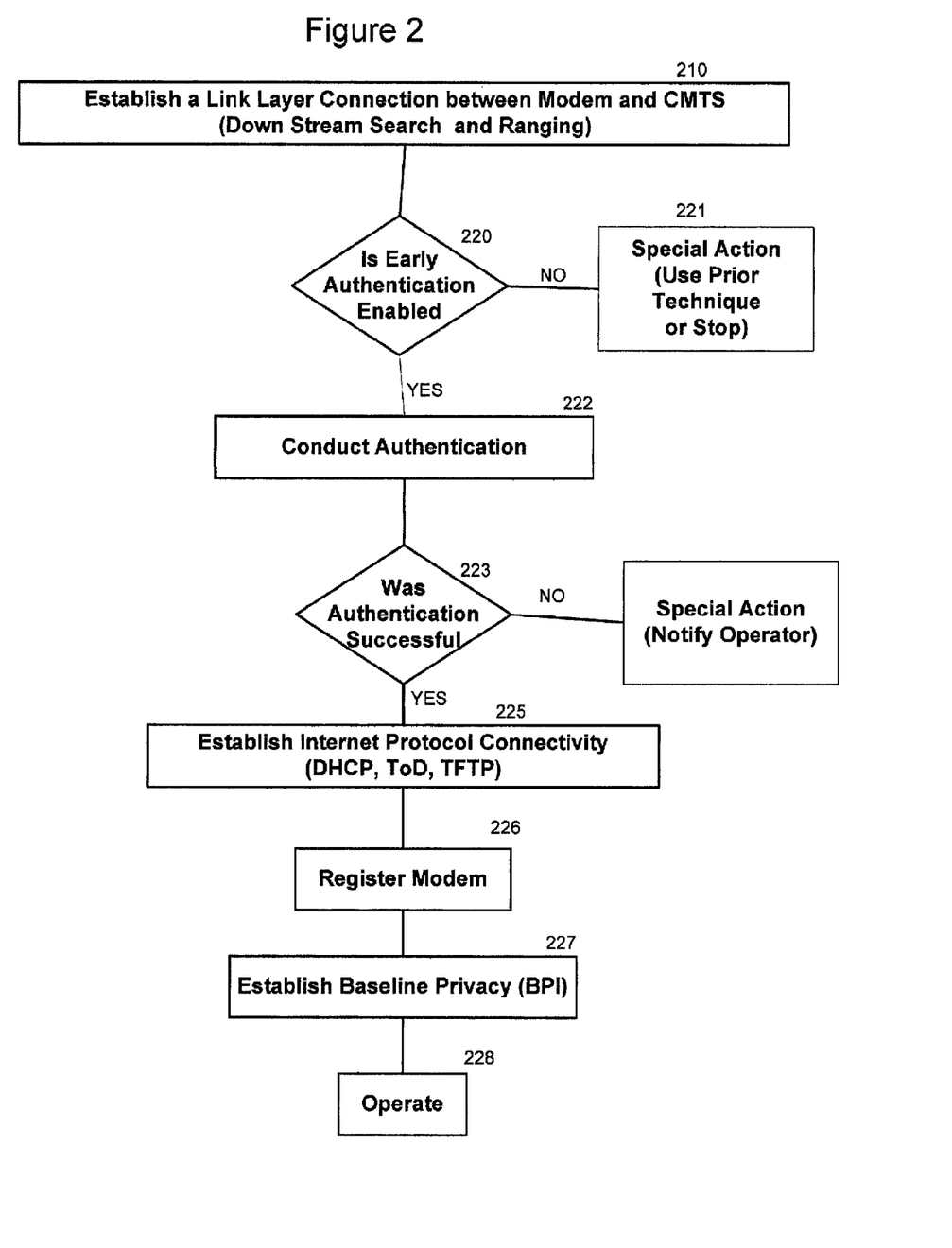
FIG. 2 is a flow diagram showing the major steps in the operation of the embodiment described herein.

FIG. 2 is a general flow diagram illustrating the initialization sequence utilized by system described herein. First, as indicated by block 210, a link layer connection is established between a cable modem and the CMTS 40. The link layer is established by a downstream search and ranging. The downstream search is used to find a signal on the line and an upstream channel descriptor (UCD) is obtained. Ranging adjusts the modem's transmit power, frequency and timing as necessary to compensate for the distance between the modem and the CMTS.

Next, as indicated by block 220, the CMTS determines if early authentication is enabled on the modem. This is determined by the configuration of the CMTS.

As indicated by block 221 if early authentication is not enabled on the modem, some special action is taken. For example, the prior art process can be used to initialize the modem or alternatively, an error signal can be generated and the process can be stopped.

If early authentication is activated, authentication is performed on the modem as indicated by block 222. This authentication process requires that the modem provide an X.509 certificate to the CMTS in order to be authenticated. If the authentication fails special action is taken as indicated by block 224. For example, if authentication fails, the CMTS can be configured to drop all except authentication messages received from the modem. Alternatively the CMTS can be configured to direct all modem provisioning messages to a special "walled garden" that can be monitored by a human operator who will then take any action that is appropriate. Alternately automatic policies are configured for specific actions on the cable modem.

If the authentication is successful, Internet protocol connectivity is established in a conventional manner as indicated by block 225. Internet protocol connectivity is established by a conventional Dynamic Host Configuration Protocol (DHCP), Time of Day time (ToD) stamp, and the use of a Trivial File Transfer Protocol (TFTP) to download a configuration file.

Next as indicated by block 226 the modem is registered in a conventional manner. That is, the modem sends the modem's configuration settings to the CMTS and if the CMTS approves, the CMTS will respond indicating that the request is successful. Finally Base Line Privacy is established for the modem as indicated by block 227. If the initialization process is successful, the system begins to operate as indicated by block 22.

Figure 3:
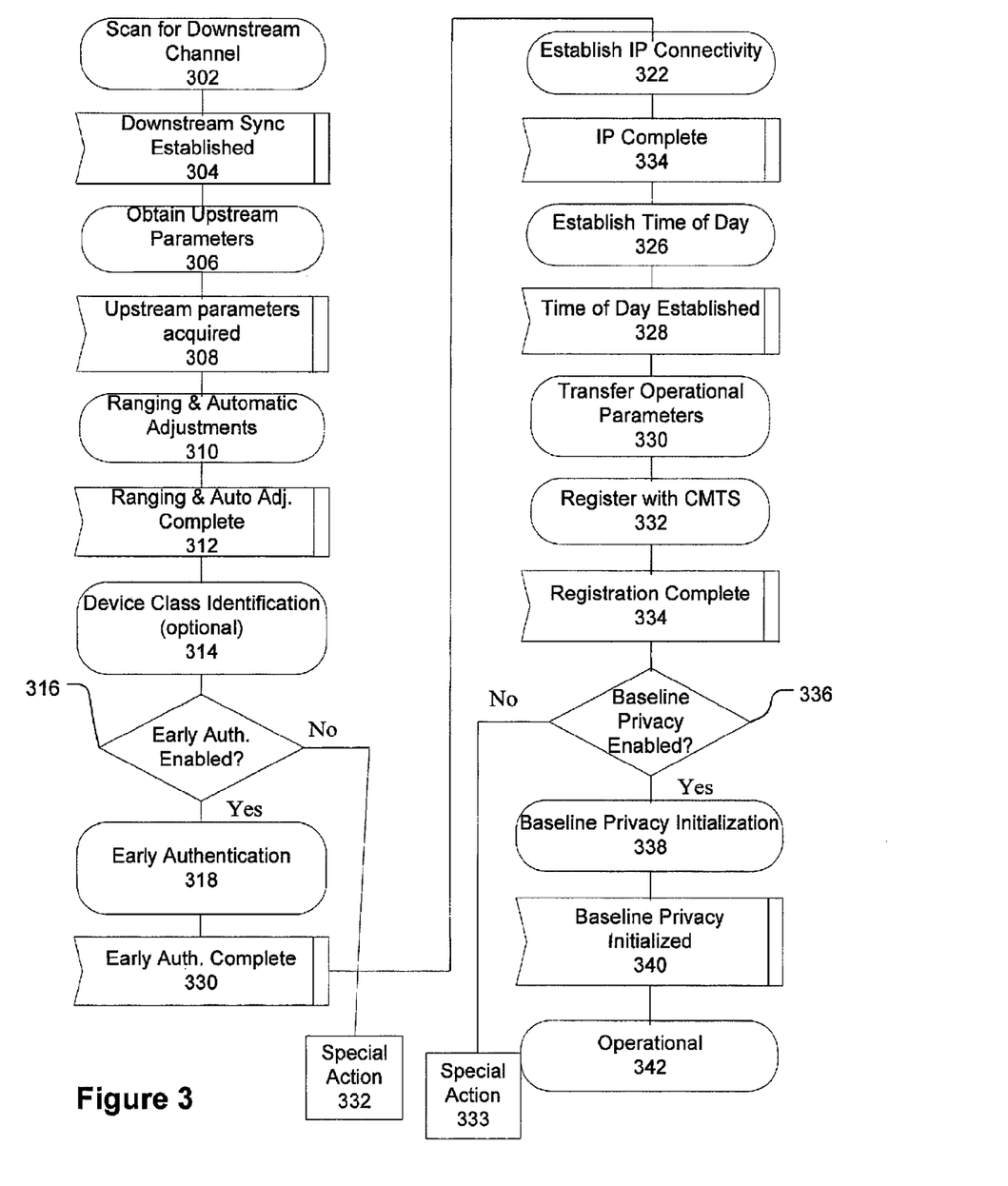
FIG. 3 is a detailed flow diagram illustrating the operations of the embodiment.

FIG. 3 is a more detailed flow diagram of the operation of the system shown in FIG. 1. The process begins as indicated by block 302 by downstream scanning to find a signal. Next as indicated by block 308 upstream parameters are obtained. Then ranging and automatic adjustments take place as indicated by blocks 310 and 340. As indicated by block 314, device class identification can optionally take place.

Next as indicated by block 316, the CMTS queries the modem to determine if early authentication is enabled. If early authentication is not enabled as indicated by block 332 some special action is taken. For example, the cable modem initialization may execute the conventional initialization process. Alternatively, the system can be configured to stop the process at this point and alert a human operator.

If early authentication is enabled, then the cable modem will undergo early authentication in blocks 318 and 320. After early authentication, the primary service flow is identified with a security association identification (SAID). This provides security for the data flow. All subsequent messages, including DHCP packets, ToD packets and TFTP packets are secured by integrity checking and encryption.

After the early authentication is complete in block 320, layer 3 Internet Protocol (IP) connectivity is established in blocks 322 and 324 and the cable modem establishes timing requirements during time of day establishment in blocks 326 and 328. Next, a transfer of operational parameters occurs as indicated by block 330.

After IP connectivity and time of day are established, a cable modem registers with a CMTS as indicated by blocks 332 and 334.

After registration is complete, the modem determines if Baseline Privacy is enabled as indicated by block 336. If baseline privacy is not enabled, special action is taken as indicated by block 333. Integrity check and encryption of data packets are suspended. Furthermore, the process may be stopped and an operator notified.

If baseline privacy is enabled in the modem, baseline privacy for SAIDs other than the primary SAID is initialized in block 338. After baseline privacy initialization is complete in block 340, the cable modem is operational as indicated by block 342.

Since the cable modem conducted early authentication as indicated by block 318, the baseline privacy initialization indicated by block 338 comprises only encryption using traffic encryption keys (TEK) for additional SAIDs other than the primary SAID. Additionally, the actions indicated by block 338 may include security associations for any secondary service flows.

It is noted that early authentication at step 318, allows reuse of authentication information in subsequent processes steps such as DHCP, TFTP and the like indicated by blocks 222 to 234.

Figure 4:
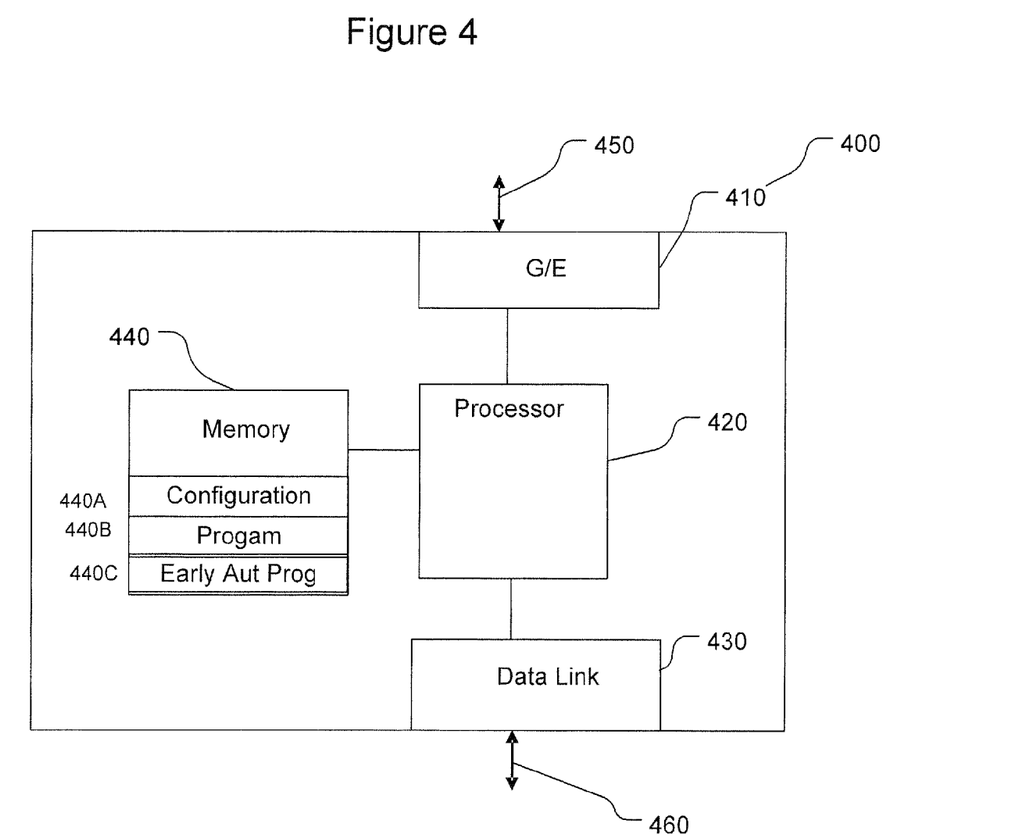
FIG. 4 illustrates an embodiment of the system shown in FIG. 1.

FIG. 4 illustrates an embodiment cable modem termination system (CMTS) 40. The CMTS is configured and programmed to perform the early authentication procedure illustrated in FIGS. 2 and 3. CMTS 40 includes a processor 420 coupled with a network interface 410. Network interface 410 is configured to send and receive Internet Protocol (IP) packets over a network such as the global Internet. For example network interfaces 410 may be a gigabit Ethernet or alternatively it can be any type of conventional network interface such as an interface for asynchronous transfer mode (ATM), synchronous optical network (SONET), and the like.

Processor 420 is also coupled with a data link interface 430 to send and receive data to the cable modems 21, 22 and 23. Data link interface 430 can be a coaxial or a hybrid fiber coaxial (HFC) connection. Network interface 410 and data link interface 430 act as ports that communicate over network connection 450 or link layer connection 460, respectively. Processor 420 is also coupled to memory 440. Memory 440 stores configuration data 440A, programming 440B to control the various normal operations that the CMTS performs, and authentication or encryption programming 440C that processor 420 executes to perform either the initialization process illustrated in FIGS. 2 and 3. The configuration data 440A specifies if early authentication is enabled for the cable modem, conducts early authentication, establishes IP connectivity with the cable modems, and registers the cable modem.

Figure 5:
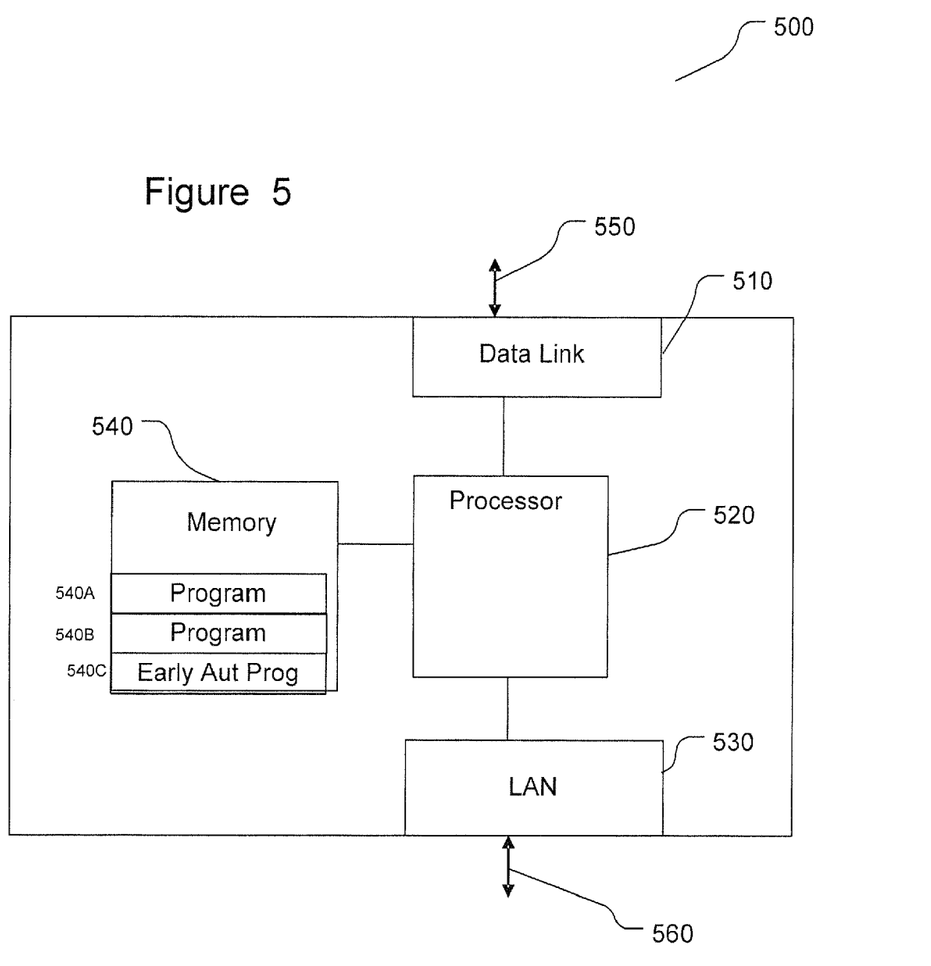
FIG. 5 illustrates an embodiment of a cable modem shown in FIG. 1.

FIG. 5 illustrates an embodiment of cable modems 21, 22 and 23. All of the modems are identical; hence, only one of the modems, namely modem 21, is illustrated in FIG. 5 and described herein. Cable modem 21 includes a processor 520 coupled to a local area network (LAN) interface 530, a data link interface 510, and a memory 540. Data link interface 510 connects cable modem 21 with CMTS 40 over a coaxial or hybrid fiber coaxial network 13.

LAN interface 530 connects to other consumer premises equipment such as personal computers A, B, C and D shown in FIG. 1. LAN interface 530 can also connect to various other, IP capable devices, wireless devices, etc. Memory 540 stores authentication and encryption information 570 that is relevant to cable modem 21. Cable modem 21 and CMTS 40 operate together as a system to conduct the initialization steps described herein. Data link interface 510 and LAN interface 530 operate as ports to communicate over a data link connection 550 or a LAN connection 560, respectively.

Processor 520 uses data link 510 to communicate with CMTS 40 and to receive a message from CMTS 40 to perform early authentication on a primary service flow, to establish IP connectivity and register with CMTS 40.

In some embodiments of the invention an operator may wish to have exceptions to early authentication. For example, if customer is having problems initializing their cable modem service they may not want to skip authentication and encryption and simply come online. Thus in some embodiments, an option is provided whereby early authentication may optionally be skipped to speed up initialization of any cable modem, or may be managed on a special cable modem-by-cable modem process. In other embodiments, an option is provided whereby early authentication may optionally be skipped to facilitate debugging, diagnosis, and troubleshooting. These options are provided by settings in a configuration file in the CMTS.

In some embodiments, when early authentication is enabled on a cable modem the cable modem must perform authentication before initialization can proceed beyond the authentication step 318 illustrated in FIG. 3. For example, in some alternative embodiments the CMTS 40 is configured to drop all messages except authentication messages from a cable modem until the cable modem is successfully authenticated. Alternatively CMTS 40 may be configured to direct cable modem provisioning messages (DHCP, ToD, TFTP) to a secured area to control provisioning according to service operator policies. In some alternative embodiments, when early authentication is disabled at the CMTS 40, a cable modem can initialize in a conventional manner.

Some embodiments may isolate special classes of recognized cable modems using DHCP. For example, the CMTS 40 can inform a DHCP server, or a provisioning server, that the CMTS 40 already has early authentication enabled, or the CMTS 40 can inform the DHCP server that a particular cable modem has not performed early authentication, and that it should thus be isolated.

Some embodiments utilize special DHCP relay options or sub-options (e.g. Option 82 sub-options in DHCPv4, or options in relay message in DHCPv6) to isolate special classes of cable modems. By default, CMTS 40 enables early authentication as described above. Early authentication can be disabled, but this would result in lost network protection. Therefore, when CMTS 40 is in a DHCP isolation configuration, early authentication stays enabled. In such an embodiment, DHCP packets from cable modems that fail early authentication are not dropped but may be labeled with special DHCP Relay Agent Information (DHCPv4 or DHCPv6) sub-options and relayed to back-end DHCP servers. The DHCP and provisioning server can then recognize such DHCPv4 and DHCPv6 Relay Agent Information sub-options and handle cable modems that fail authentication according to back-end server configurations and polices.

In a CMTS, DHCP isolation configuration, if a cable modem attempts to acquire an IPv4 address before performing early authentication, then the CMTS can use special DHCP Option 82 sub-options to label specific types of cable modems. The CMTS operating as a DHCP relay agent inserts a special DHCP Option 82 sub-option in such cable modem's DHCPv4 packets based on the type of the cable modem. Likewise, if a cable modem attempts to acquire an IPv6 address, then CMTS can use special DHCPv6 Vendor Specific Information Option sub-options to label specific types of cable modems. The CMTS may act as a DHCP relay agent and insert a special sub-option of DHCPv6 Vendor Specific Information Option in the cable modem's DHCPv6 packet based on the special type of the cable modem.

In some embodiments CMTS 40 is configured so that when early authentication is enabled, before the cable modem authenticates itself, CMTS 40 responds to messages sent to the CMTS 40 in a particular manner. For example, the CMTS 40 can drop all messages from the cable modem other than authentication messages. This prevents the cable modem from accomplishing anything before it is authenticated. Alternatively the CMTS 40 can be programmed to forward messages (DHCP, TFTP, ToD, all non authentication messages, etc.) to a secure storage and provide the cable modem with limited services until authentication is complete.

In some embodiments, if a cable modem fails early authentication, the cable modem may send an early authentication message containing credentials to CMTS 40. If the cable modem credentials fail at the CMTS 40, the CMTS 40 normally would drop all subsequent packets. CMTS 40 may insert information in DHCP packets to notify a provisioning server (back-end) that the subject cable modem has failed authentication. Then the provisioning server can send the cable modem a web-page telling the subscriber that they have failed authentication along with contact information for service personnel.

Some embodiments provide a scalable method that delivers bonding services to hybrid cable modems, while maintaining the type of early authentication described above in order to protect the network. For example, some DOCSIS 2.0 based cable modems support channel bonding and use a special ranging request message to request bonding services, but such modems may not be capable of early authentication. Such cable modems may be called "hybrid cable modems." Hybrid cable modems that are incapable or performing early authentication do not perform early authentication after ranging. Instead, such hybrid cable modems initiate DHCP exchanges after ranging completes. This is done by sending CMTS 40 a DHCPDISCOVER (DHCPv4) or a Solicit (CHCPv6) message after ranging. Instead of dropping the DHCP packets, the CMTS 40 may inspect Option 60 in the client DHCPv4 messages and Option 16 in client DHCPv6 messages, to allow the hybrid cable modem to initialize.

In the example given above, if the Option 60 value of a DHCPv4 packet indicates DOCSIS 2.0 or less ("docsis2.0", etc), then CMTS 40 doesn't drop the packet but relays it to a back-end DHCP server. Before relaying the DHCP packet from a hybrid CM, CMTS 40 may insert a sub-option y in the DHCP Option 82 Vendor-Specific Information Sub-option identified by a vendor's enterprise number. If the Option 16 value of a DHCPv6 message indicates DOCSIS 2.0 or less ("docsis2.0", etc), then the CMTS 40 inserts in the DHCPv6 message a sub-option yy in the Vendor Specific Information Option identified by vendor's enterprise ID, in the relay message, and relays the packet to the back-end DHCP server.

The back-end DHCP server and provisioning server would recognize such a cable modem as a hybrid cable modem by recognizing the existence of either (1) sub-option y in the DHCPv4 Option 82 Vendor-Specific Information Sub-option, or (2) sub-option yy in the DHCPv6 Vendor Identifying Vendor Specific Option in the relay message. The provisioning server then provides a hybrid cable modem a configuration file that contains bonding parameters, according to operator policies.

The present invention may be embodied in other specific forms without departing from its spirit or essential characteristics of the invention. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are embraced as being within the scope of the appended claims.

The invention claimed is:
1. A method comprising:
sending messages from and receiving messages by a cable modem termination system (CMTS) to establish a link layer connection between a cable modem and said CMTS;
sending messages from and receiving messages by said CMTS to authenticate said cable modem on a primary service flow;
sending messages from and receiving messages by said CMTS to establish IP connectivity between said cable modem and said CMTS after said cable modem has been authenticated;
sending messages from and receiving messages by said CMTS to register said cable modem with the CMTS after said IP connectivity has been established;
determining whether baseline privacy is enabled in said cable modem after said cable modem is registered with the CMTS; and
responsive to a determination that baseline privacy is not enabled in said cable modem, suspending at least one of an integrity check and encryption of data.

2. The method of claim 1 further comprising interrogating a configuration file in said CMTS to determine if early authentication prior to registration is enabled on said CMTS.

3. The method of claim 1 including:
determining by messages sent from or received by said CMTS if authentication prior to registration is enabled on said cable modem and if authentication prior to registration is not enabled, dropping all messages except authentication messages from the cable modem until it is successfully authenticated.

4. The method of claim 1 wherein if the cable modem fails authentication prior to registration, the method further comprising directing cable modem provisioning messages received by said CMTS to a secured storage area.

5. The method of claim 1 including determining from messages sent from and received by said CMTS if authentication prior to registration is enabled on said cable modem and if authentication prior to registration is not enabled, authenticating said cable modem after said cable modem is registered.

6. A cable modem termination system (CMTS) including a processor configured to:
establish a link layer connection to a cable modem;
authenticate said cable modem prior to registration of said cable modem;
establish IP connectivity between said CMTS and said cable modem after said authentication is complete;
register said cable modem after said connectivity has been established;
determine whether baseline privacy is enabled in said cable modem after said cable modem is registered;
responsive to a determination that baseline privacy is enabled in said cable modem, initialize baseline privacy in said cable modem; and
responsive to a determination that baseline privacy is not enabled in said cable modem, suspend at least one of an integrity check and encryption of data.

7. The CMTS of claim 6, wherein said processor is configured to provide traffic encryption keys for encryption on at least one secondary service flow.

8. The CMTS of claim 6, wherein said processor is configured to drop all messages except authentication messages from the cable modem until the cable modem is successfully authenticated.

9. The CMTS of claim 6, wherein said processor is configured to interrogate a configuration file stored on said CMTS to determine if authentication prior to registration is enabled on said CMTS.

10. The CMTS of claim 6, wherein said processor is configured to send and receive dynamic host configuration protocol (DHCP) provisioning messages, time of day (ToD) provisioning messages, and trivial file transfer protocol (TFTP) provisioning messages.

11. The CMTS recited in claim 6 wherein said processor is configured to send and receive messages to determine if a cable modem is configured for authentication prior to registration.

12. The CMTS recited in claim 6 wherein said processor is configured to send all messages from said cable modem to a secure area if authentication prior to registration fails.

13. The CMTS recited in claim 6 wherein said processor is configured to authenticate said cable modem based on an X.509 certificate received from said cable modem.

14. A cable modem including:
- a port to communicate over a link layer connection with a cable modem termination system (CMTS);
- a processor adapted to:
    - receive messages from said CMTS via said port to conduct authentication of said cable modem on a primary service flow prior to registration of said modem;
    - establish IP connectivity with said CMTS;
    - register said cable modem with said CMTS after said authentication is complete;
    - determine whether baseline privacy is enabled in said cable modem after said cable modem is registered with said CMTS;
    - responsive to a determination that baseline privacy is enabled in said cable modem, initialize baseline privacy in said cable modem; and
    - responsive to a determination that baseline privacy is not enabled in said cable modem, suspend at least one of an integrity check and encryption of data.

15. The cable modem of claim 14 wherein said processor is further adapted to utilize encryption keys for encryption on at least one secondary service flow.

16. The cable modem of claim 14 wherein said cable modem includes a configuration file.

17. The cable modem of claim 14 wherein said processor is further adapted to provide an X.509 certificate to be used by said CMTS to conduct said authentication of said cable modem on said primary service flow.

18. The cable modem of claim 14, wherein said processor is further adapted to, responsive to suspending at least one of said integrity check and encryption of data, notify an operator.

19. The cable modem of claim 14, wherein said primary service flow is identified by a primary security association identification (SAID).

20. The cable modem of claim 15, wherein said primary service flow is identified by a primary security association identification (SAID) and said at least one secondary service flow is identified by a secondary SAID.

21. The cable modem of claim 20, wherein said processor is further adapted to initialize baseline privacy for said secondary SAID.

* * * * *